(12) United States Patent
Ohkuma et al.

(10) Patent No.: US 11,458,829 B2
(45) Date of Patent: Oct. 4, 2022

(54) HYBRID VEHICLE

(71) Applicant: HONDA MOTOR CO., LTD., Tokyo (JP)

(72) Inventors: Kanae Ohkuma, Wako (JP); Christopher Lang, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 577 days.

(21) Appl. No.: 16/560,269

(22) Filed: Sep. 4, 2019

(65) Prior Publication Data
US 2020/0079205 A1 Mar. 12, 2020

(30) Foreign Application Priority Data

Sep. 6, 2018 (JP) .............................. JP2018-166627

(51) Int. Cl.
*B60K 6/00* (2006.01)
*B60K 6/26* (2007.10)
*B60L 53/12* (2019.01)
*B60K 6/52* (2007.10)
*B60K 6/28* (2007.10)
*B60K 13/04* (2006.01)

(52) U.S. Cl.
CPC ................. *B60K 6/26* (2013.01); *B60K 6/28* (2013.01); *B60K 6/52* (2013.01); *B60K 13/04* (2013.01); *B60L 53/12* (2019.02); *B60Y 2200/92* (2013.01); *B60Y 2400/82* (2013.01)

(58) Field of Classification Search
CPC ... B60K 6/40; B60K 6/44; B60K 6/28; B60K 6/52; B60K 13/04
See application file for complete search history.

(56) References Cited

U.S. PATENT DOCUMENTS 5,127,489 A * 7/1992 Takato .................. B60K 13/04
248/60
6,041,877 A * 3/2000 Yamada ................. B60K 6/543
180/242

(Continued)

FOREIGN PATENT DOCUMENTS

JP 2012-040893 A 3/2012
JP 2013-014274 A 1/2013

(Continued)

OTHER PUBLICATIONS

Office Action dated Feb. 12, 2020, issued in counterpart JP Application No. 2018-166627, with English translation (8 pages).

*Primary Examiner* — Hau V Phan
(74) *Attorney, Agent, or Firm* — WHDA, LLP

(57) ABSTRACT

A first connector on a case front wall of a battery pack is connected to a first electric motor with a first power line interposed therebetween. A second connector on a case rear wall of the battery pack is connected to a second electric motor with a second power line interposed therebetween. A fuel tank is arranged behind the battery pack. A muffler is disposed on an exhaust pipe extending from an engine toward the rear along a side surface in a vehicle width direction of the battery pack and is inclined so as to be near the fuel tank behind the battery pack. The second power line is at least partially arranged in a space surrounded by the second connector, the fuel tank, and the muffler as seen in a vertical direction.

8 Claims, 4 Drawing Sheets

(56) References Cited

U.S. PATENT DOCUMENTS

| | | | | |
|---|---|---|---|---|
| 7,314,424 | B2* | 1/2008 | Supina | F16H 3/725 |
| | | | | 477/3 |
| 7,467,678 | B2* | 12/2008 | Tanaka | B60K 6/445 |
| | | | | 180/65.265 |
| 7,533,754 | B2* | 5/2009 | Burrows | B60K 23/08 |
| | | | | 475/5 |
| 9,096,117 | B2* | 8/2015 | Matsuda | B60K 6/48 |
| 9,490,460 | B2 | 11/2016 | Yanagi | |
| 10,369,878 | B2* | 8/2019 | Frank | B60K 6/26 |
| 10,384,527 | B2* | 8/2019 | Frank | B60K 6/442 |
| 2002/0151197 | A1* | 10/2002 | Kawakita | H01R 9/226 |
| | | | | 439/76.2 |
| 2008/0251246 | A1* | 10/2008 | Ohkuma | H01M 10/486 |
| | | | | 429/90 |
| 2010/0170294 | A1* | 7/2010 | Nakagami | H01L 25/162 |
| | | | | 62/505 |
| 2015/0129345 | A1* | 5/2015 | Suzuki | B60K 6/44 |
| | | | | 903/951 |
| 2016/0226041 | A1* | 8/2016 | Jackson | B60K 1/04 |
| 2017/0232867 | A1* | 8/2017 | Fukazu | B60K 11/06 |
| | | | | 318/503 |
| 2018/0012198 | A1* | 1/2018 | Ricci | G06Q 30/0601 |
| 2018/0048957 | A1* | 2/2018 | Petley | G10K 11/178 |
| 2018/0201144 | A1 | 7/2018 | Newman | |
| 2018/0215248 | A1* | 8/2018 | Shinkai | B60K 6/52 |
| 2018/0304738 | A1* | 10/2018 | Kuwahara | B60K 6/40 |

FOREIGN PATENT DOCUMENTS

| | | |
|---|---|---|
| JP | 2014-022092 A | 2/2014 |
| JP | 2014-22092 A | 2/2014 |
| JP | 2017-140992 A | 8/2017 |
| WO | 2013/073661 A1 | 5/2013 |

* cited by examiner

HYBRID VEHICLE

CROSS REFERENCES TO RELATED APPLICATIONS

The present application claims priority under 35 U.S.C. § 119 to Japanese Patent Application No. 2018-166627 filed Sep. 6, 2018, entitled "Hybrid Vehicle." The contents of this application are incorporated herein by reference in their entirety.

TECHNICAL FIELD

The present disclosure relates to a hybrid vehicle including an engine and a first electric motor disposed in a front portion of a vehicle body, including a second electric motor disposed in a rear portion of the vehicle body, and power is supplied to the first electric motor and the second electric motor from a battery pack mounted in a central portion of the vehicle body.

BACKGROUND

A motor-driven four-wheel-drive vehicle that includes a battery pack mounted in a central portion of its vehicle body, that supplies power from the battery pack to a front-wheel traction motor mounted in a front portion of the vehicle body through a power cable for front wheels, and that supplies power from the battery pack to a rear-wheel traction motor mounted in a rear portion of the vehicle body through a power cable for rear wheels is publicly known from Japanese Unexamined Patent Application Publication No. 2014-22092.

Because such a motor-driven four-wheel-drive vehicle includes the front and rear power lines for use in supplying power to the front and rear motors, it is necessary to have space for the power lines in the vehicle body.

SUMMARY

For example, the present application describes efficient arrangement of a second power line for use in supplying power from a battery pack to a second electric motor mounted in a rear portion of a vehicle body in a motor-driven four-wheel-drive vehicle.

According to a first aspect of an embodiment, a hybrid vehicle includes an engine, a first electric motor, a second electric motor, a fuel tank, and a muffler. The hybrid vehicle supplies power to the first electric motor and the second electric motor from a battery pack mounted in a central portion of a vehicle body. The engine and the first electric motor are disposed in a front portion of the vehicle body. The second electric motor is disposed in a rear portion of the vehicle body. The first electric motor is connected to a first connector disposed on a case front wall of the battery pack with a first power line interposed therebetween. The second electric motor is connected to a second connector disposed on a case rear wall of the battery pack with a second power line interposed therebetween. The fuel tank is arranged behind the battery pack. The muffler is disposed on an exhaust pipe extending from the engine toward the rear along a side surface in a vehicle width direction of the battery pack and is inclined so as to be near the fuel tank behind the battery pack. The second power line is at least partially arranged in a space surrounded by the second connector, the fuel tank, and the muffler as seen in a vertical direction.

In the configuration according to the first aspect, for example, the second power line can be arranged with high space efficiency by utilizing an empty space created because the muffler, which may be heated to high temperatures, cannot be arranged near the fuel tank, which stores combustible fuel.

According to a second aspect of the embodiment, in addition to the configuration according to the first aspect, the second connector may be arranged in a location surrounded by the case rear wall of the battery pack, the fuel tank, and the muffler.

In the configuration according to the second aspect, for example, the second connector can be compactly arranged while interference with the fuel tank and the muffler is avoided.

According to a third aspect of the embodiment, in addition to the configuration according to the first aspect, the second connector may not overlap the fuel tank in the vehicle width direction as seen in the vertical direction.

In the configuration according to the third aspect, for example, the second connector can be compactly arranged while interference with the fuel tank is avoided.

According to a fourth aspect of the embodiment, in addition to the configuration according to the first aspect, a charger or a wireless charging pad may be arranged in front of the battery pack, and the charger or the wireless charging pad may not overlap the first connector as seen in the vertical direction.

In the configuration according to the fourth aspect, for example, the first connector can be compactly arranged while interference with the charger or the wireless charging pad is avoided.

According to a fifth aspect of the embodiment, in addition to the configuration according to the first aspect, the second connector, the fuel tank, and the muffler may overlap each other in a height direction thereof.

In the configuration according to the fifth aspect, for example, the narrow and difficult-to-use space surrounded by the second connector, the fuel tank, and the muffler can be efficiently used for arranging the second power line.

BRIEF DESCRIPTION OF THE DRAWINGS

The advantages of the disclosure will become apparent in the following description taken in conjunction with the following drawings.

DETAILED DESCRIPTION

An embodiment is described below with reference to FIGS. 1 to 4. A longitudinal direction, a lateral direction (vehicle width direction), and a vertical direction in the present specification are defined with respect to an occupant sitting in the driver's seat.

Figure 1:
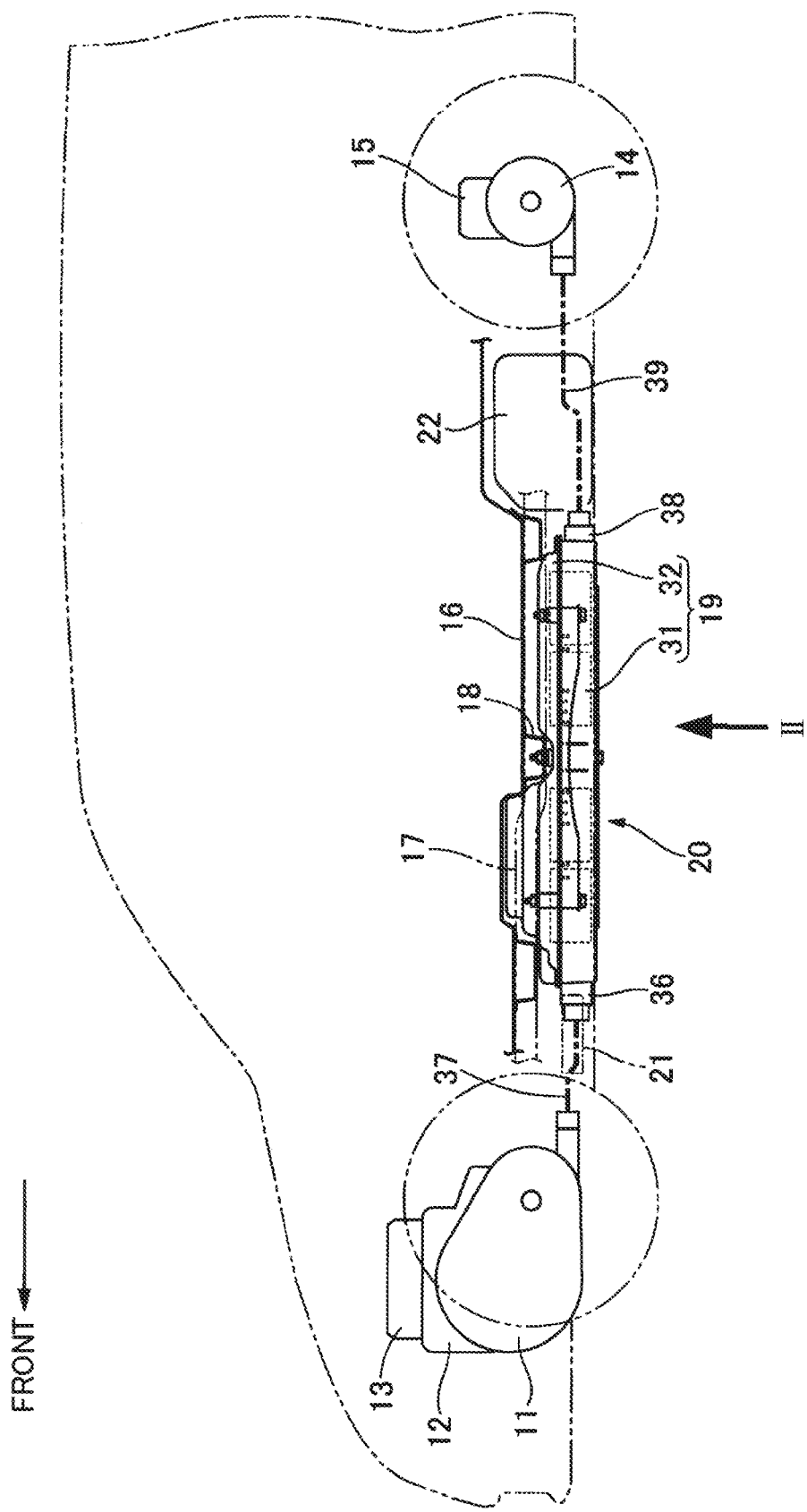
FIG. 1 is a side view of a vehicle body of a plug-in hybrid vehicle.

As illustrated in FIG. 1, a first electric motor 11 configured to drive front wheels, an engine 12 configured to drive a generator for charging a battery, and a power drive unit 13 including an inverter configured to control the driving of the first electric motor 11 are mounted in a front portion of a vehicle body of a plug-in hybrid four-wheel-drive vehicle. A second electric motor 14 configured to drive rear wheels and a power drive unit 15 including an inverter configured to control the driving of the second electric motor 14 are mounted in a rear portion of the vehicle body of the plug-in hybrid vehicle.

Figure 2:
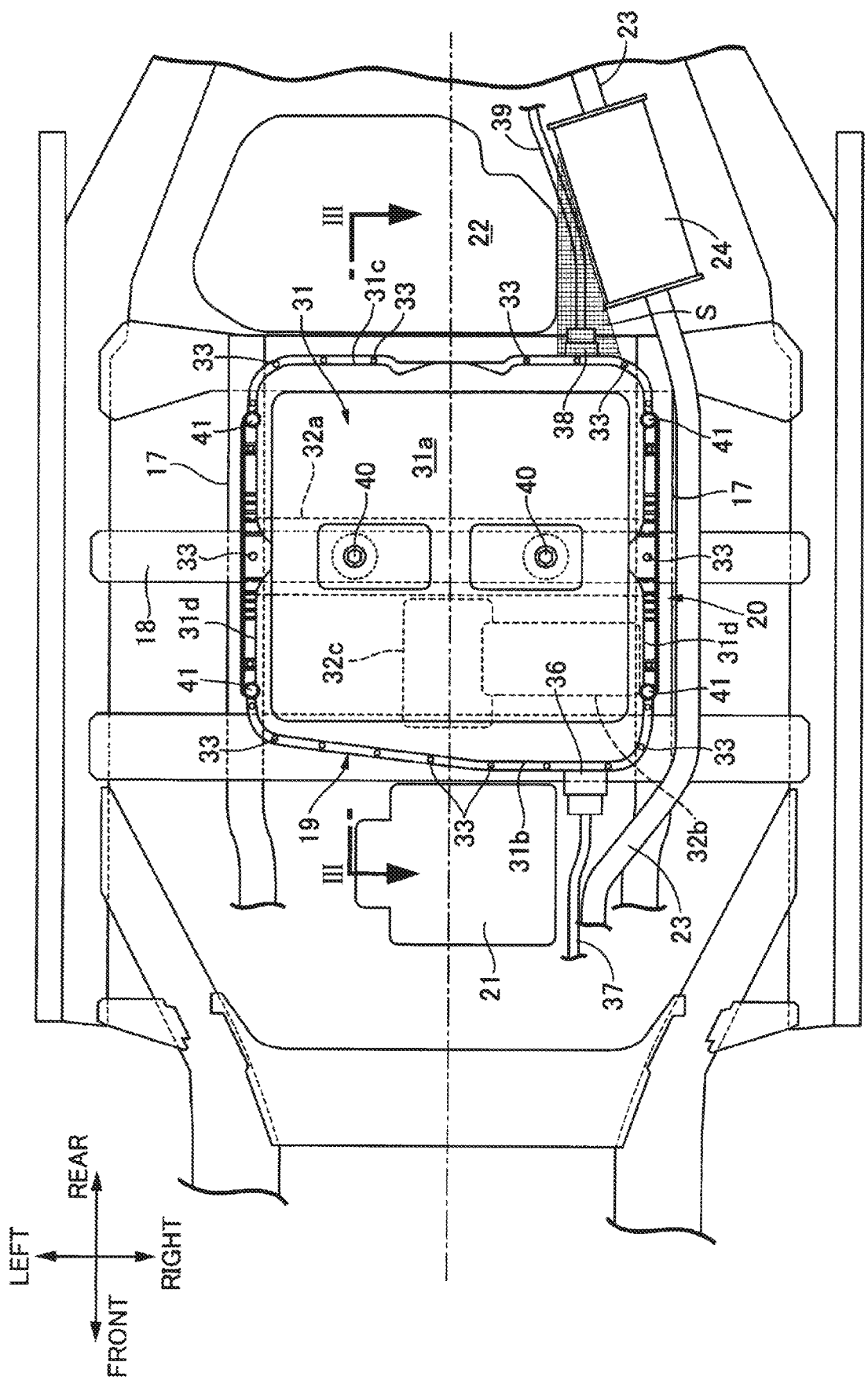
FIG. 2 is an illustration viewed from the direction of an arrow II in FIG. 1.
Figure 3:
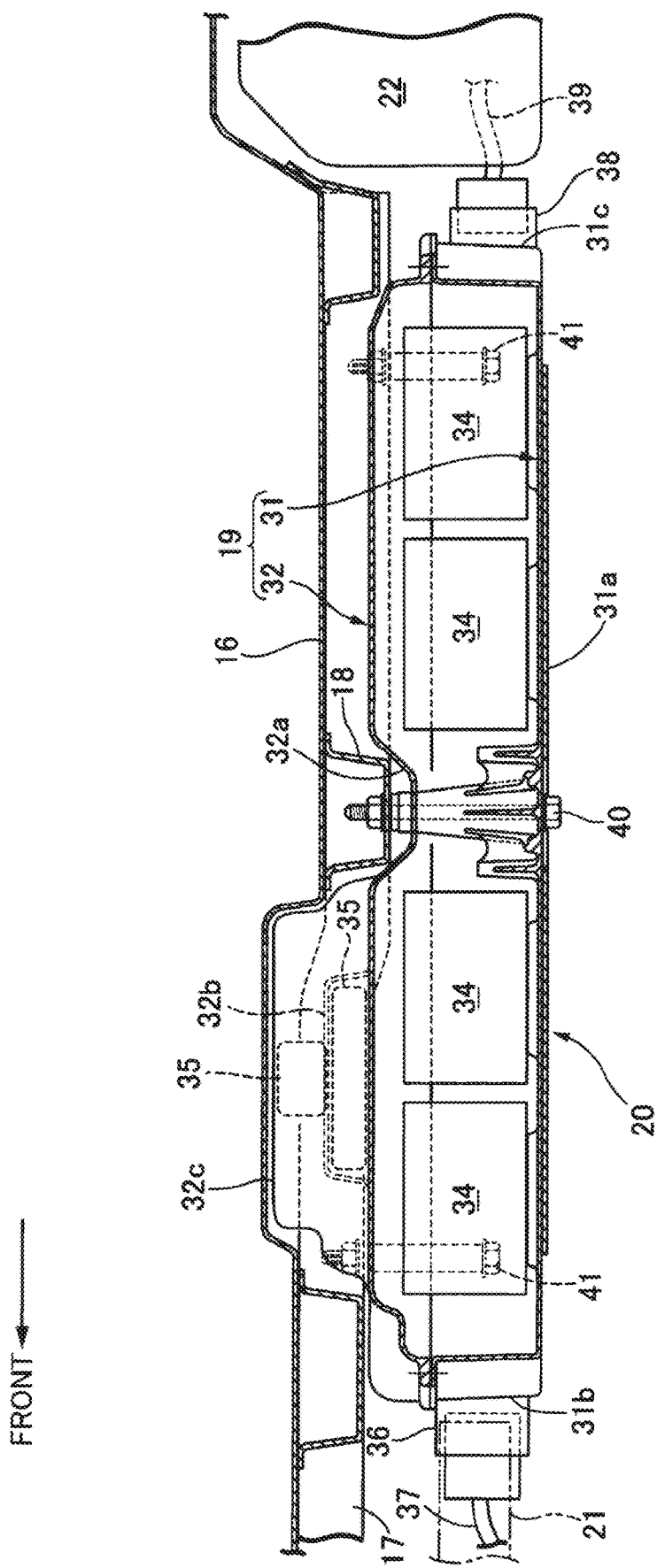
FIG. 3 is a cross-sectional view taken along a line III-III in FIG. 2.

As illustrated in FIGS. 2 and 3, a left-and-right pair of floor frames 17 extending in the longitudinal direction is disposed on a lower surface of a floor panel 16, and the left and right floor frames 17 are connected at their intermediate portions in the longitudinal direction by a floor cross member 18 extending in the vehicle width direction. A battery pack 20 in which the battery configured to drive the first electric motor 11 and the second electric motor 14 is housed in a battery case 19 is fixed on the lower surface of each of the left and right floor frames 17 and the floor cross member 18. A charger 21 (or a wireless-type charging pad) connected to a power source outside the vehicle body with a charging cable interposed therebetween and configured to charge the battery is arranged in front of the battery pack 20. A fuel tank 22 configured to store fuel for driving the engine 12 is arranged behind the battery pack 20.

Figure 4:
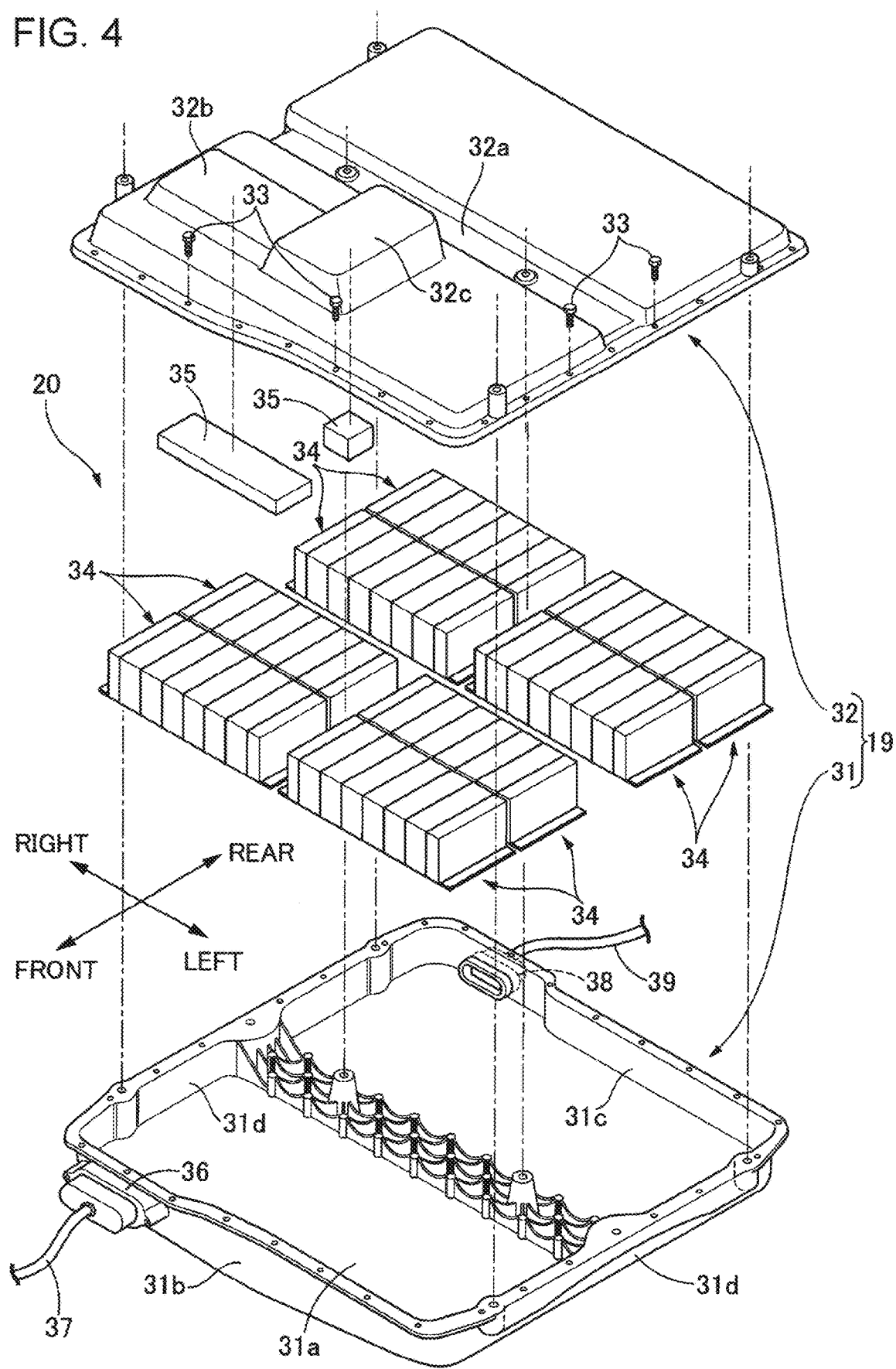
FIG. 4 is an exploded perspective view of a battery pack.

As illustrated in FIGS. 3 and 4, the battery case 19 includes a case main body 31 open upward and formed by die casting using a metal (e.g., aluminum) and a cover 32 open downward and formed by die casting using a metal (e.g., aluminum). The case main body 31 and the cover 32 are joined together in the vertical direction by a plurality of bolts 33 at their outer regions. Eight battery modules 34 are mounted in the bottom portion of the case main body 31 of the battery case 19, above which electrical components 35, for example, a battery control device, a junction board, and a cell voltage sensor, are arranged.

The case main body 31 has the shape of a shallow container and includes a case bottom wall 31$a$, a case front wall 31$b$, a case rear wall 31$c$, and left and right case side walls 31$d$. The case bottom wall 31$a$ is substantially flat. The case front wall 31$b$ extends upward from the outer edge of the case bottom wall 31$a$. The cover 32 of the battery case 19 has a depression 32$a$ having a groove shape recessed downward. The cover 32 also has upwardly protruding protrusions 32$b$ and 32$c$ for housing the electrical components 35 in its front portion.

A first power line 37 connected to a first connector 36 disposed on the case front wall 31$b$ of the case main body 31 of the battery case 19 extends toward the front of the vehicle body and is connected to the power drive unit 13 for the first electric motor 11. A second power line 39 connected to a second connector 38 disposed on the case rear wall 31$c$ of the case main body 31 of the battery case 19 extends toward the rear of the vehicle body and is connected to the power drive unit 15 for the second electric motor 14.

In a state where the floor cross member 18 is fit in the depression 32$a$ of the cover 32, the battery case 19 having the above-described configuration is secured to the floor cross member 18 by two bolts 40 passing through its central portion in the longitudinal direction from the lower area to the upper area and is secured to the floor frames 17 by two bolts 41 passing through its left edge in the vehicle width direction from the lower area to the upper area and two bolts 41 passing through its right edge in the vehicle width direction from the lower area to the upper area.

As illustrated in FIG. 2, an exhaust pipe 23 extending from the engine 12 toward the rear is arranged along the right side surface of the battery pack 20 and is connected to a muffler 24 arranged behind the battery pack 20. The muffler 24, the fuel tank 22, and the second connector 38 are arranged on the same horizontal plane, the muffler 24 is inclined such that its rear end portion is near the fuel tank 22 with respect to its front end portion, and thus a space S having a triangular shape as seen in plan view (see the hatched section in FIG. 2) is defined between the left side surface of the muffler 24, the right side surface of the fuel tank 22, and the rear surface of the second connector 38. The second power line 39, which extends from the second connector 38 toward the rear, is arranged in the space S.

The second connector 38 is arranged in a location surrounded by the case rear wall 31$c$ of the battery pack 20, the fuel tank 22, and the muffler 24. The location of the second connector 38 does not overlap the fuel tank 22 in the vehicle width direction as seen in the vertical direction, that is, is on the right of the right end of the fuel tank 22.

The first connector 36, which is disposed on the case front wall 31$b$ of the battery case 19, is arranged so as not to overlap the charger 21 as seen in the vertical direction.

Next, the operation of the embodiment having the above-described configuration are described.

The four-wheel-drive hybrid vehicle includes the first electric motor 11 configured to drive the front wheels and disposed in the front portion of the vehicle body and the second electric motor 14 configured to drive the rear wheels and disposed in the rear portion of the vehicle body. The battery pack 20 mounted in the central portion of the vehicle body supplies power to the first electric motor 11 through the first connector 36 disposed on the case front wall 31$b$ of the battery case 19 and then through the first power line 37 and supplies power to the second electric motor 14 through the second connector 38 disposed on the case rear wall 31$c$ of the battery pack 20 and then through the second power line 39.

The charger 21 (or wireless charging pad), which is arranged in front of the battery pack 20, does not overlap the first connector 36 as seen in the vertical direction. Therefore, the first connector 36 can be compactly arranged while interference with the charger 21 is avoided.

The second power line 39, which extends from the second connector 38 disposed on the case rear wall 31$c$ of the battery pack 20 toward the rear, is arranged in the space S, which is surrounded by the left side surface of the muffler 24, which is inclined such that its rear end portion is near the fuel tank 22 with respect to its front end portion behind the battery pack 20, the right side surface of the fuel tank 22, which is arranged behind the battery pack 20, and the second connector 38. Therefore, the second power line 39 can be compactly arranged with high space efficiency by effectively utilizing an empty space left because the muffler 24, which may be heated to high temperatures, cannot be arranged near the fuel tank 22, which stores combustible fuel.

In that configuration, because the second connector 38, the fuel tank 22, and the muffler 24 overlap each other in the height direction, the space S, which is surrounded by the second connector 38, the fuel tank 22, and the muffler 24, is narrow and difficult to use. That space S, however, can be efficiently used for arranging the second power line 39.

Moreover, because the second connector 38 is arranged in the location surrounded by the case rear wall 31$c$ of the battery pack 20, the fuel tank 22, and the muffler 24 and in the location that does not overlap the fuel tank 22 in the vehicle width direction as seen in the vertical direction, the second connector 38 can be more compactly arranged while interference with the fuel tank 22 and the muffler 24 is avoided.

Various design changes may be made to the embodiment described above within a range that does not depart from the scope of the present application.

For example, not all of the second power line 39 may be arranged in the space S, which is surrounded by the second connector 38, the fuel tank 22, and the muffler 24. The second power line 39 is at least partially arranged in the space S.

The exhaust pipe 23, which runs along the right side surface of the battery pack 20 in the above-described embodiment, may alternatively run along the left side surface of the battery pack 20. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A hybrid vehicle comprising:
   an engine;
   a first electric motor;
   a second electric motor;
   a fuel tank;
   a battery pack including a case including a front wall and a rear wall; and
   a muffler,
   wherein
   the engine and the first electric motor are disposed in a front portion of a vehicle body,
   the second electric motor is disposed in a rear portion of the vehicle body,
   the battery pack is mounted in a central portion of the vehicle body, the central portion being located between the front portion and the rear portion, and the battery pack supplies power to the first electric motor and the second electric motor, the front wall of the case facing toward the front portion of the vehicle body, and the rear wall of the case facing toward the rear portion of the vehicle body,
   the first electric motor is connected to a first connector with a first power line interposed therebetween, the first connector being disposed on the front wall of the battery pack,
   the second electric motor is connected to a second connector disposed on the rear wall of the battery pack with a second power line interposed therebetween,
   the fuel tank is disposed at a rear of the battery pack,
   the muffler is disposed at the rear of the battery pack, the muffler is provided to an exhaust pipe extending from the engine toward the rear of the vehicle body, the exhaust pipe extending along a side surface of the battery pack facing a vehicle width direction, and the muffler is inclined so as to be closer to the fuel tank toward the rear of the vehicle body,
   the muffler is spaced apart from the fuel tank in the vehicle width direction to have a space therebetween in a plan view of the vehicle, and
   the second power line is at least partially disposed in the space which is surrounded by the second connector, the fuel tank, and the muffler in the plan view.

2. The hybrid vehicle according to claim 1, wherein the second connector is disposed in a location surrounded by the rear wall of the battery pack, the fuel tank, and the muffler.

3. The hybrid vehicle according to claim 1, wherein the second connector does not overlap the fuel tank in the vehicle width direction in the plan view.

4. The hybrid vehicle according to claim 1, wherein a charger or a wireless charging pad is disposed in front of the battery pack, and
   the charger or the wireless charging pad does not overlap the first connector in the plan view.

5. The hybrid vehicle according to claim 1, wherein the second connector, the fuel tank, and the muffler overlap each other in a height direction thereof.

6. The hybrid vehicle according to claim 1, wherein the second power line is disposed between the fuel tank and the muffler in the plan view.

7. The hybrid vehicle according to claim 1, wherein the second connector is disposed between the fuel tank and the muffler in the plan view.

8. The hybrid vehicle according to claim 1, wherein the second electric motor is disposed at the rear of the fuel tank.

* * * * *